United States Patent
Koch et al.

(10) Patent No.: US 9,446,447 B2
(45) Date of Patent: Sep. 20, 2016

(54) METHOD AND DEVICE FOR PRODUCING MOTOR VEHICLE CHASSIS PARTS

(75) Inventors: Hubert Koch, Dorsten (DE); Andreas Kleine, Blankenburg/Harz (DE); Erhard Stark, Nister-Mohrendorf (DE); Manikandan Loganathan, Hildesheim (DE); Klaus Greven, Hildesheim (DE); Roland Golz, Wernigerode (DE)

(73) Assignees: KSM CASTINGS GROUP GMBH, Hildesheim (DE); TRIMET ALUMINIUM SE, Essen (DE)

( * ) Notice: Subject to any disclaimer, the term of this patent is extended or adjusted under 35 U.S.C. 154(b) by 849 days.

(21) Appl. No.: 13/578,353

(22) PCT Filed: Jan. 25, 2011

(86) PCT No.: PCT/EP2011/000291
§ 371 (c)(1),
(2), (4) Date: Apr. 4, 2013

(87) PCT Pub. No.: WO2011/098213
PCT Pub. Date: Aug. 18, 2011

(65) Prior Publication Data
US 2013/0186525 A1 Jul. 25, 2013

(30) Foreign Application Priority Data
Feb. 11, 2010 (DE) .......... 10 2010 007 812

(51) Int. Cl.
*B22C 9/06* (2006.01)
*B22D 15/00* (2006.01)
(Continued)

(52) U.S. Cl.
CPC ............ *B22D 25/06* (2013.01); *B22C 9/06* (2013.01); *B22D 15/00* (2013.01); *B22D 27/04* (2013.01); *C22C 21/04* (2013.01); *C22C 21/10* (2013.01); *C22F 1/043* (2013.01)

(58) Field of Classification Search
CPC ...... B22D 15/00; B22D 25/06; B22D 27/04; B22C 9/06
USPC ..................... 164/151.4, 342, 348
See application file for complete search history.

(56) References Cited

U.S. PATENT DOCUMENTS 3,619,181 A    11/1971 Willey
4,444,245 A *   4/1984 Hippert .......... B22D 11/115
                                            164/468

(Continued)

FOREIGN PATENT DOCUMENTS

AT    202365 B    3/1959
AT    204793 B    8/1959

(Continued)

OTHER PUBLICATIONS

Office Action issued Nov. 3, 2010 in DE Application No. 10 2010 007 812.3.

(Continued)

*Primary Examiner* — Kevin P Kerns
(74) *Attorney, Agent, or Firm* — Panitch Schwarze Belisario & Nadel LLP

(57) ABSTRACT

A method and device for producing motor vehicle chassis parts is provided. The motor vehicle chassis parts can be subjected to tensile stress, compressive stress and torsion and the mechanical strength of the motor vehicle chassis parts can be adjusted over the respective cross-section. The motor vehicle chassis parts have high ductility and temperature stability and are made of an AlSiZnMg alloy by permanent mould casting.

9 Claims, 19 Drawing Sheets

(51) Int. Cl.

| | | |
|---|---|---|
| *B22D 25/06* | (2006.01) | |
| *B22D 27/04* | (2006.01) | |
| *C22C 21/04* | (2006.01) | |
| *C22C 21/10* | (2006.01) | |
| *C22F 1/043* | (2006.01) | |

(56) References Cited

U.S. PATENT DOCUMENTS

| | | | |
|---|---|---|---|
| 4,674,553 A | 6/1987 | Witt | |
| 4,719,961 A * | 1/1988 | Vogels | B22D 11/0408 164/439 |
| 5,467,810 A * | 11/1995 | Grove | B22D 11/0408 164/418 |
| 6,333,482 B1 | 12/2001 | Sauer et al. | |
| 6,354,561 B1 | 3/2002 | Fahrion | |
| 2004/0055732 A1* | 3/2004 | LeBlanc | B22D 11/0403 164/444 |
| 2005/0115695 A1* | 6/2005 | Mangler | B22D 11/055 164/443 |
| 2005/0191204 A1 | 9/2005 | Lin et al. | |
| 2009/0301682 A1* | 12/2009 | Proske | B22D 27/04 164/80 |
| 2010/0243194 A1* | 9/2010 | Luce | B22D 11/0605 164/428 |

FOREIGN PATENT DOCUMENTS

| | | |
|---|---|---|
| DE | 19627930 A1 | 1/1998 |
| DE | 102007017690 A1 | 10/2008 |
| DE | 102007037931 A1 | 2/2009 |
| EP | 1645647 A1 | 4/2006 |
| EP | 1645647 B1 | 12/2007 |
| GB | 2118079 A | 10/1983 |
| GB | 2229407 A | 9/1990 |
| JP | 02-284741 A | 11/1990 |
| JP | 07-032121 A | 2/1995 |
| WO | 2005075692 A1 | 8/2005 |
| WO | 2005090628 A1 | 9/2005 |
| WO | 2007051162 A2 | 5/2007 |

OTHER PUBLICATIONS

Aluminium-Taschenbuch, Aluminium-Verlag, Düsseldorf, pp. 385-387 (1983).
Int'l Search Report issued Sep. 21, 2011 in Int'l Application No. PCT/EP2011/000291.
Davis, "ASM Sepcialty Handbook Aluminium and Aluminium Alloys," ASM International, Materials Park, OH, p. 45 (1996).
Aluminium Rheinfelden GmbH, "Anwendungsmerkblatt Unifont-90 Unifont-90 dv," retrieved from the internet at www.alurheinfelden.com/c/document_library/get_file?p_l_id=135938folderId=516378name=DLVE-492.pdf (Aug. 1999).
Int'l Preliminary Examination Report issued May 22, 2012 in Int'l Application No. PCT/EP2011/000291.
Written Opinion issued Sep. 21, 2011 in Int'l Application No. PCT/EP2011/000291.
Written Opinion issued Jan. 27, 2012 in Int'l Application No. PCT/EP2011/000291.
Response to Written Opinion, dated Nov. 28, 2011, in Int'l Application No. PCT/EP2011/000291.
Response to Written Opinion, dated Mar. 15, 2012, in Int'l Application No. PCT/EP2011/000291.
W. Patterson, S. Engler: "Einfluss des Erstarrungsablaufs aauf das Speisungsvermö gen von Gussiegierungen", Giesserei 48 (1961), Heft 21, S. 633-638.

* cited by examiner

Detail A

METHOD AND DEVICE FOR PRODUCING MOTOR VEHICLE CHASSIS PARTS

CROSS-REFERENCE TO RELATED APPLICATIONS

This application is a Section 371 of International Application No. PCT/EP2011/000291, filed Jan. 25, 2011, which was published in the German language on Aug. 18, 2011, under International Publication No. WO 2011/098213 A3 and the disclosure of which is incorporated herein by reference.

BACKGROUND OF THE INVENTION

The invention relates to a method and device for producing motor vehicle chassis parts which can be subjected to tensile stress, compressive stress and torsion and the mechanical strength of which can be adjusted over the respective cross-section, and which furthermore have high ductility and temperature stability and are made of an AlSiZnMg alloy, by means of permanent mould casting.

It is known to make highly stressed motor vehicle chassis parts from artificially ageing alloys by means of gravity casting or low-pressure casting. The artificially ageing alloys include, for example, G-AlSi12, G-AlSi10Mg, G-AlSi5Mg, G-Al3Si as well as copper-containing alloys which may additionally contain titanium, magnesium, nickel, or nickel and magnesium.

Heat treatment is dependent on the respective alloy. G-AlSi10Mg, for example, is solution heat treated at 520 to 530° C. and, after a solution treatment time of 3 to 5 hours, it is quenched in water of 20° C. Artificial ageing takes place at temperatures between 160 and 165° C. for 8 to 10 hours. Exact data for the respective alloys relating to the heat treatment of castings can be found in chapter 7.8, pages 429 ff. of Aluminiumtaschenbuch, 14th edition.

The multistage heat treatment which needs to be performed following the casting process is costly in terms of time and money. The success of the heat treatment is dependent on the exact adherence to the treatment specifications, and the annealing furnaces used in each case must permit only a very small spatial variation in temperature. As the conditions for age-hardening always apply to the complete component part, its micro-structure cannot be optimally adapted to the stress to which the chassis parts are subjected, which stress varies over the cross-section. Normally, the following minimum values in respect of mechanical strength must be achieved:

yield strength greater than 160 MPa and strain A greater than 5%.

BRIEF SUMMARY OF THE INVENTION

The object of the present invention is to propose a simple and cost-effective method as well as a casting device suitable for carrying out said method which enable the production of heavy-duty chassis parts, the mechanical strength values of which can be adjusted over the respective cross-section, and which have high ductility and temperature stability as well as low porosity, using a naturally aging alloy of the AlSiZnMg type.

To achieve the above-mentioned object, a method and a device according to the present invention are proposed. Preferred embodiments of the method and the device are described herein.

Accordingly, the present method for producing motor vehicle chassis parts which can be subjected to tensile-compressive stress and torsion relates to influencing the mechanical strength, ductility and temperature stability of a casting made of AlSiZnMg alloy.

According to the invention, an aluminum alloy comprising (in percent by weight)
Si 5-11%
Zn 4-9%
Mg 0.2-1.0%
Sr 60-500 ppm
and optionally at least one of the following elements:
Mo 0.01-0.15%
B 0.001-0.010%
and maximally
Zr 0.15%
Ti 0.15%
Fe 0.30%
Cu 0.10%
as well as further impurities
individually up to 0.07%
in total, up to 0.15%
is cast in a segmented permanent mould adapted in a shell-shaped manner to the contours of the chassis part, the individual segments of the permanent mould being cooled or heated in a zone of punctiform to surface-like configuration, thus producing an interdendritic, eutectic mixed crystal structure consisting of Al mixed crystals and AlSi eutectic with coherent phases formed by precipitations of $MgZn_2$ and/or $Mg_3Zn_3Al_2$, and the casting, immediately after solidification, being removed from the mould and naturally aged.

Preferably, the mass ratio permanent mould/chassis parts is 0.9 to 1.2 and the eutectic melt is intermittently cooled or heated in the permanent mould shell, at a rate of cooling of 0.01 to 10° C./s, to obtain a pasty solidification with intermetallic phases that are interdendritically distributed in the AlSi eutectic, whereby an AlSiZnMg mixed crystal structure is formed that is homogenous and identical in each cross-section of the chassis part.

To achieve a grain refinement of the melt, advantageously, B and/or Ti, in the form of $AlB_2$, $Al_3Ti$ and AlTiC, may be added and by a treatment of the melt (degassing) a density index of less than 10% can be adjusted.

According to the inventive method the melt is filled into the shell-shaped permanent mould such that it rises from the bottom (low-pressure permanent mould) or such that it falls down from the top (gravity permanent mould), the wall of the permanent mould having a temperature of 350 to 410° C. during the filling phase, and the melt being quenched selectively and intermittently at the cross-sections that are subjected to tensile/compressive stresses, at a cooling rate of 5 to 10° C./s, until complete solidification occurs, whereas the ductile regions of the chassis part are cooled at a cooling rate of 0.1 to 4° C./s.

The device according to the present invention for the production of heavy-duty chassis parts made of an AlSiZnMg alloy comprises a steel base frame 1, one or more mould segments 2, 3, an ejector system and the casting system, and furthermore a temperature control for the mould segments in association with water cooling or air cooling as well as heating, mould segments 2, 3 made of permanent mould shells, having thin-walled and thick-walled regions, that are floatingly supported on the base frame 1, with the thick-walled regions being formed as supports for the mould segments on the base frame while clamp bolts are arranged in the thin-walled regions to achieve a punctual clamping of the mould segments to the base frame. To cool the mould segments, water connections or air connections are provided on zones having punctiform to surface-like configuration, the local temperature distribution being detectable by means of thermal sensors, and the respective thermal stress in the mould segments being compensated for by means of the clamp bolts.

A further development of the device according to the invention consists in that the supports are arranged in the marginal regions of the mould segments (2, 3) and are each provided with a centering device and a sliding surface that corresponds to a correspondingly shaped counter surface on the steel frame (1).

In the contour region of the permanent mould shell, ejectors are arranged which, apart from removing the casting, also serve to vent and, if required, to cool the mould cavity.

The permanent mould may be vented via slot nozzles and venting inserts 13-16, with suction of the core gases being performed via corresponding connections, preferably in the region of core prints or core inserts or inserted parts.

Advantageously, the zones having punctiform to surface-like configuration are provided with specific cooling devices, such as vertical cooling holes or plate-type cooling devices, with the punctiform areas—relative to the diameter—being in the range from 10 to 40 mm, preferably 15-25 mm, and the surface-like zones being configured in the range from 1000 to 50000 mm².

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
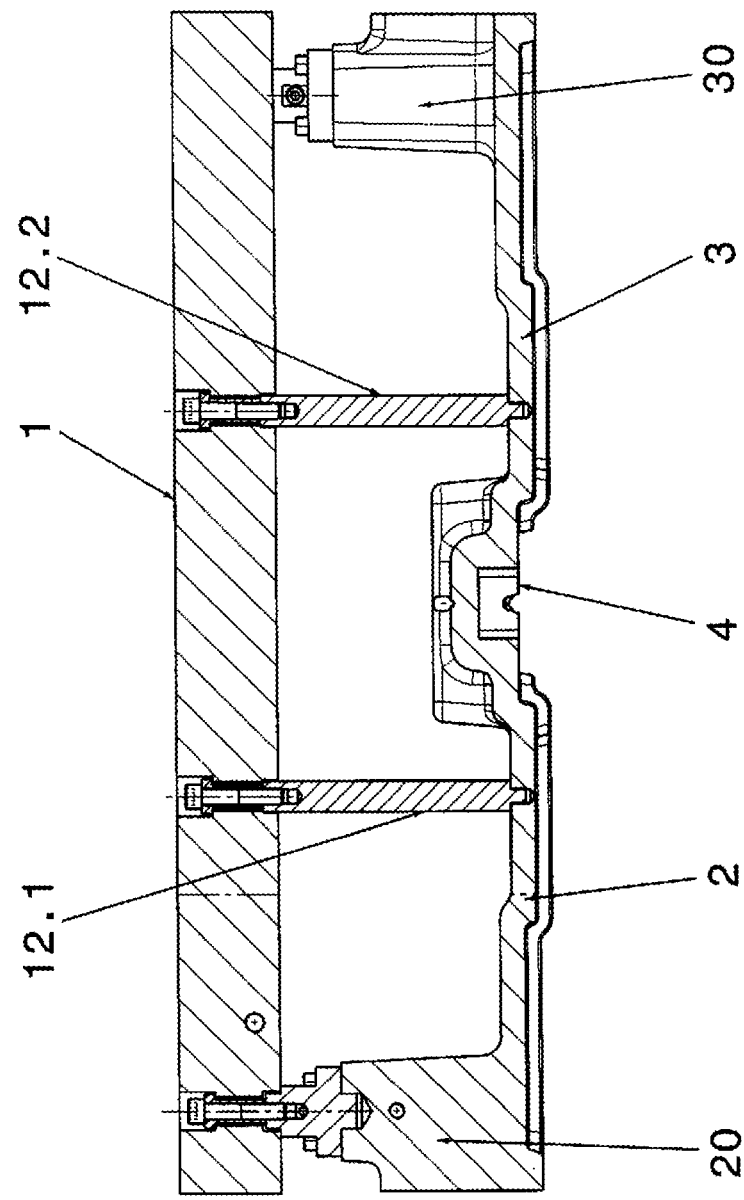
FIG. 1 shows a cross-section through a device according to the present invention.

FIG. 1 shows the basic structure of a segmented permanent mould for the production of motor vehicle chassis parts which can be subjected to tensile-compressive stresses and torsion, without a cooling or heating device. The segmented permanent mould, which is adapted in a shell-shaped manner to the contour of a motor vehicle chassis part, comprises a base frame 1, mould segments 2, 3 and supports 20, 30 for supporting the mould segments on the base plate 1.

Clamp bolts 12.1 and 12.2 connecting the mould segments 2, 3 to the base plate 1 are disposed laterally of an insert 4, which is preferably made of a heavy-duty special alloy based on tungsten-nickel.

According to FIG. 1, the mould segments 2, 3 have thin- and thick-walled areas, with the thick-walled areas being configured as supports 20, 30 in the example according to FIG. 1. A more detailed representation of that bearing region can be seen in the partial cross-section according to FIG. 2.

Figure 2:
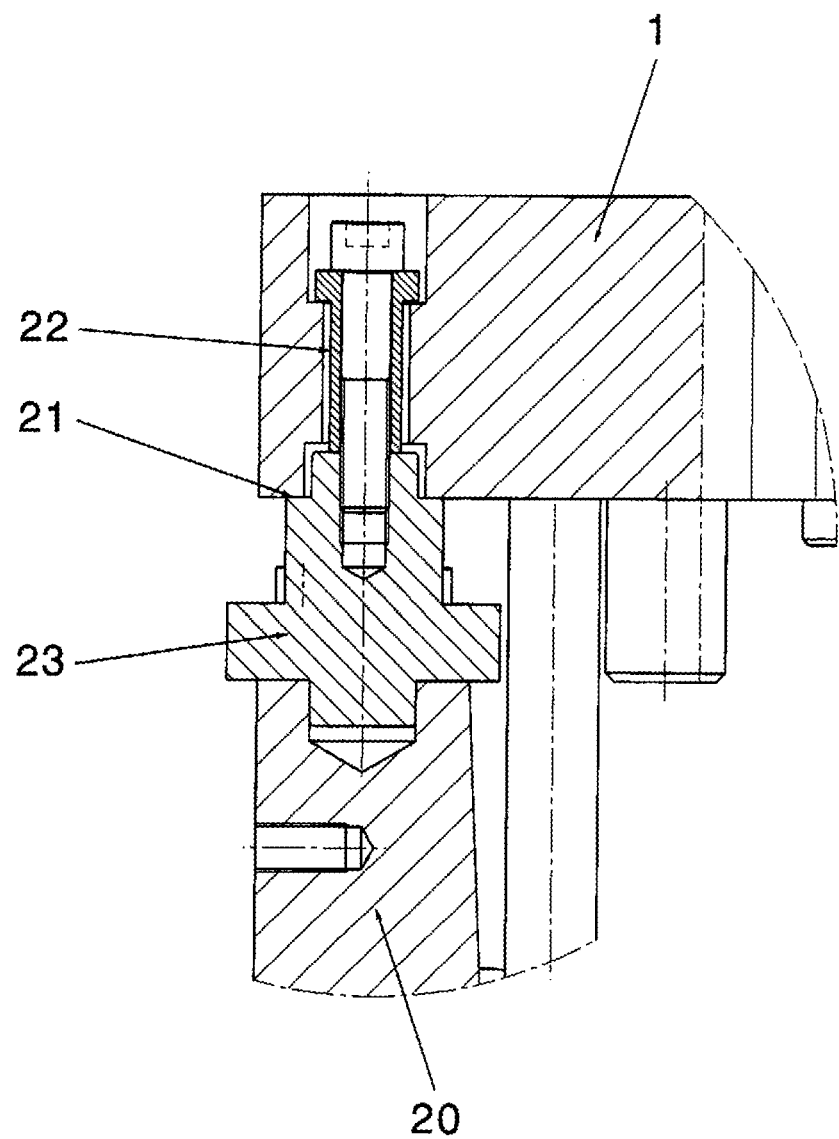
FIG. 2 partial cross-section in the marginal region of the device according to the invention shown in FIG. 1.

As can be seen in FIG. 2, the upper part of the support 20 is formed by a sliding surface 21 that is arranged on a sliding member 23 which is non-positively connected to the mould segment. To centre the mould segments on the base plate, a respective guide pin 22 is connected with each sliding member 23.

By means of this design it is made possible that when thermal stresses occur, guiding of the mould segments in the base frame is ensured and that, on the other hand, impermissible deformations can be compensated for by a preloading of the clamp bolts 12.1 and 12.2, respectively.

The afore-described design of the mould segments is necessary so as to enable the mould segments to be floatingly supported on the base frame 1. The mould segments are designed as a so-called permanent mould shell, with the surface of the casting increasing in thickness, following the contours, towards the rear side. The wall thicknesses lie in the range from 28-30 mm in the thin areas so that in these areas the individual segments of the permanent mould can be selectively cooled or heated so as to enable the generation of the desired interdendritic, eutectic mixed crystal structure consisting of Al mixed crystals and an AlSi eutectic comprising coherent phases. In special areas where a particularly short heating or cooling time is provided for, the wall thicknesses of the segmented permanent mould are reduced by 10 to 20 mm.

Figure 3:
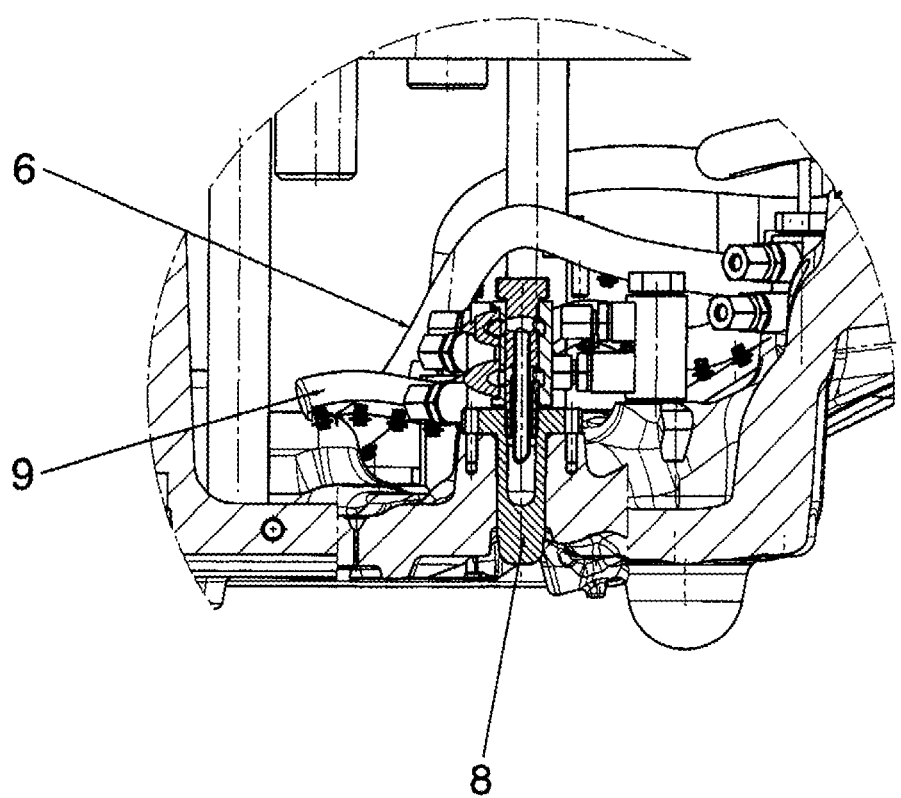
FIG. 3 partial cross-section in the central region of the device according to the invention shown in FIG. 1.
Figure 4:
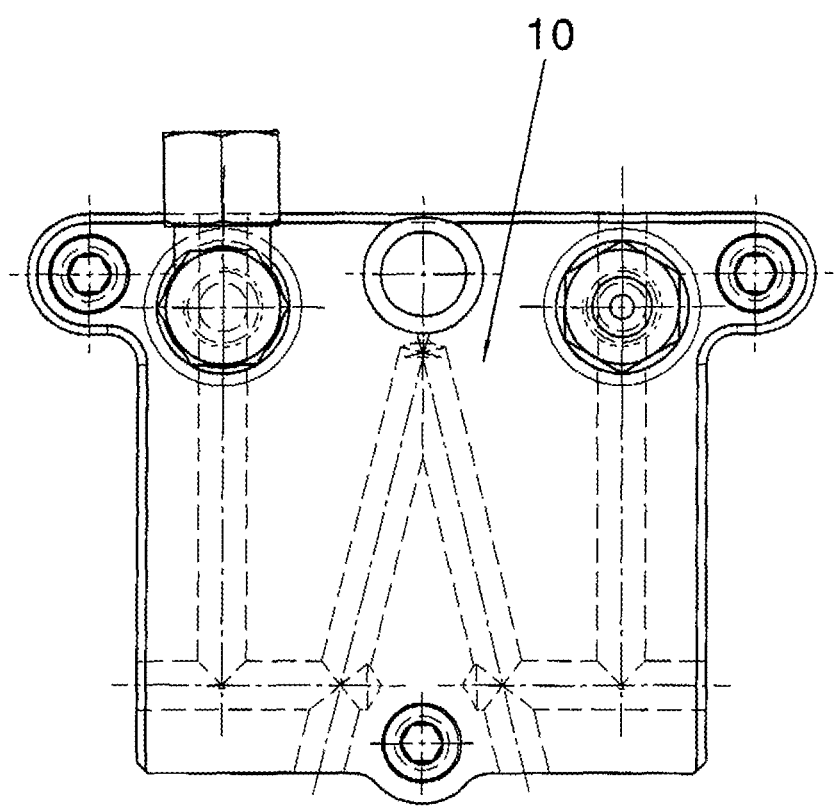
FIG. 4 perspective view of a cooling device for area cooling of the device according to the invention.
Figure 5:
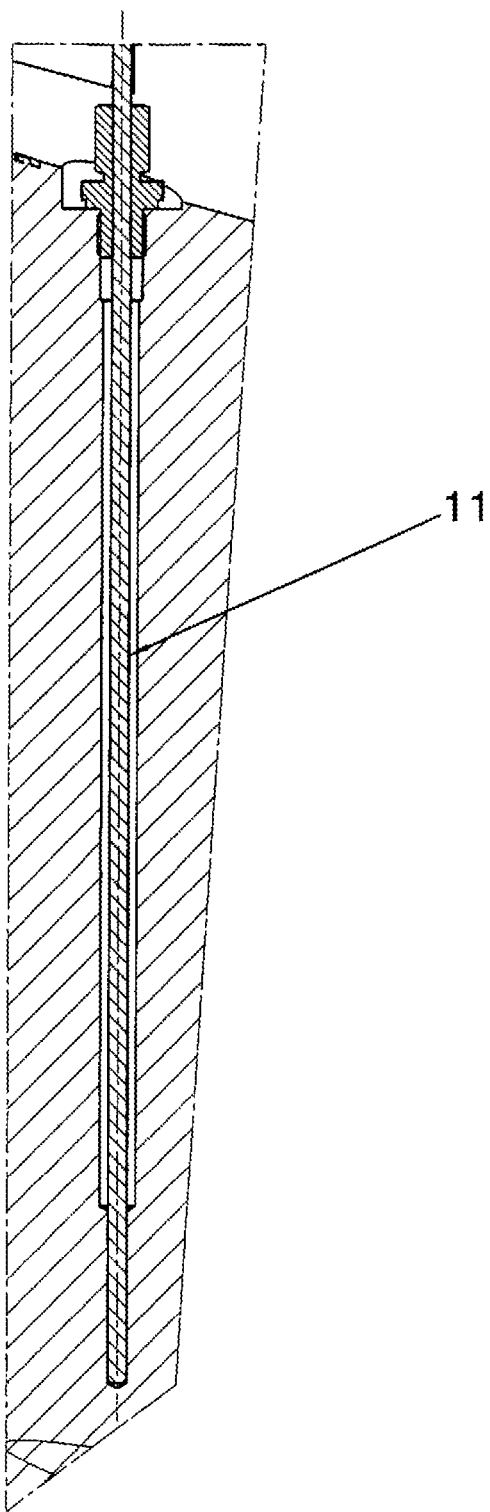
FIG. 5 partial cross-section through a device according to the invention, in the region of a temperature sensor.

According to the invention it is furthermore provided that the segments can be heated or cooled in a zone that is of a punctiform to surface-like configuration. For this purpose, an example of a punctual cooling, by a vertical cooling hole 8, and of a cooling of surface-like configuration, by cooling air channel 9, is shown in FIG. 3. Also shown in FIG. 3 is a compressed air pipe 6. For larger surfaces which are to be evenly cooled with a high cooling power, the cooling device in the form of a cooling plate 10 shown in FIG. 4 may be used.

The local temperature distribution in the mould segments can be determined by means of temperature sensors 11, said sensors preferably being connected to a processor (not shown) that monitors the adherence to the preset cooling and heating phases, via integrated process monitoring, and performs corrections when deviations from the set values occur.

Figure 6:
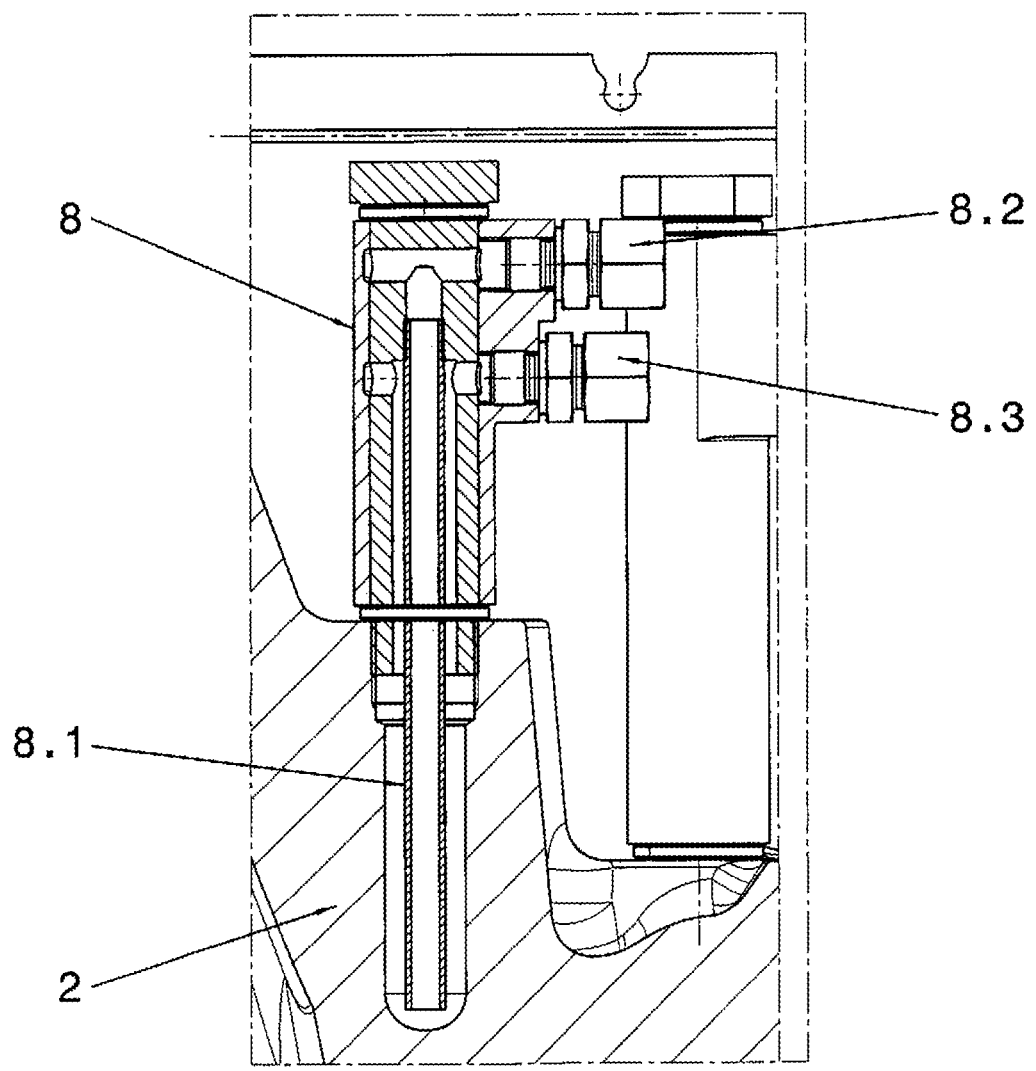
FIG. 6 partial cross-section through a device according to the invention, in the region of a vertical cooling hole.

FIG. 6 shows another partial cross-section through the device according to the invention in the region of the vertical cooling hole 8. Here, a cooling tube 8.1 is inserted in the region of the mould segment 2 to be cooled, and the coolant medium is supplied via connection 8.2 and output via an outlet connection 8.3. The cooling effect can be controlled, for example, via the amount of cooling medium and the cooling time. To this end, the supply flow of cooling medium may be influenced by means of a valve, and the discharge flow by means of a throttle. The aim of this measure is to specifically influence the mechanical characteristic values required for the respective chassis parts by controlling the process of solidification.

Figure 7:
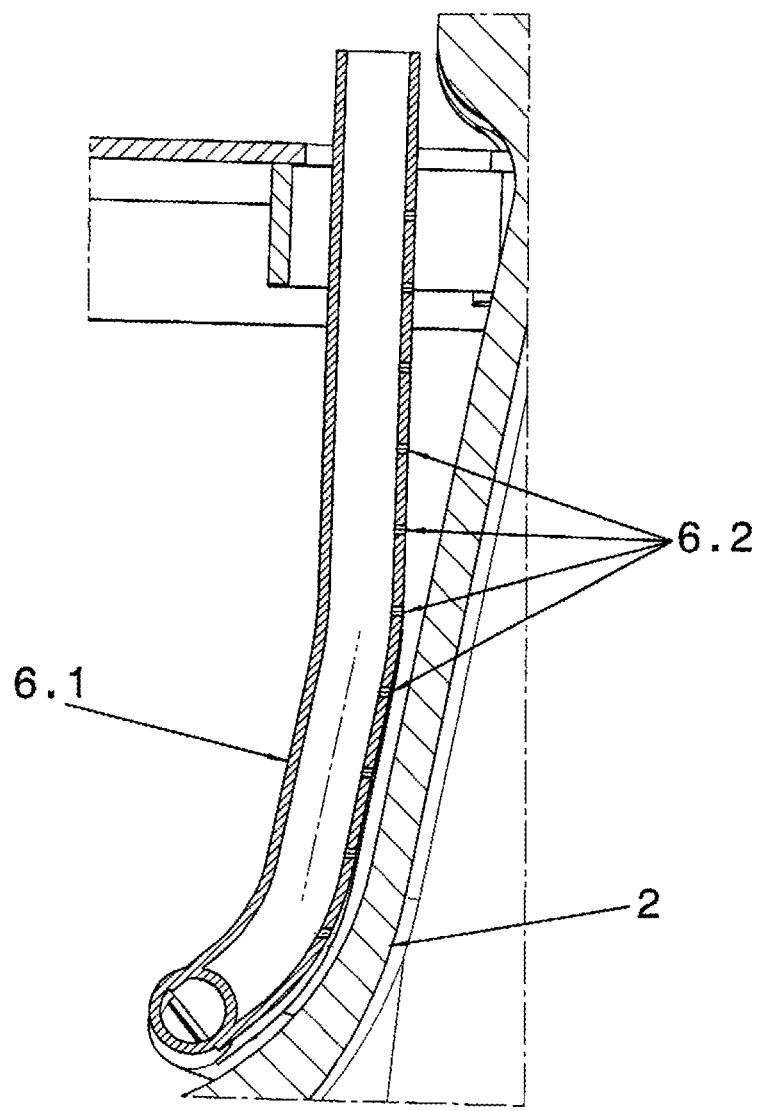
FIGS. 7 to 9 three variants of a device according to the invention, in the region of air cooling.
Figure 8:
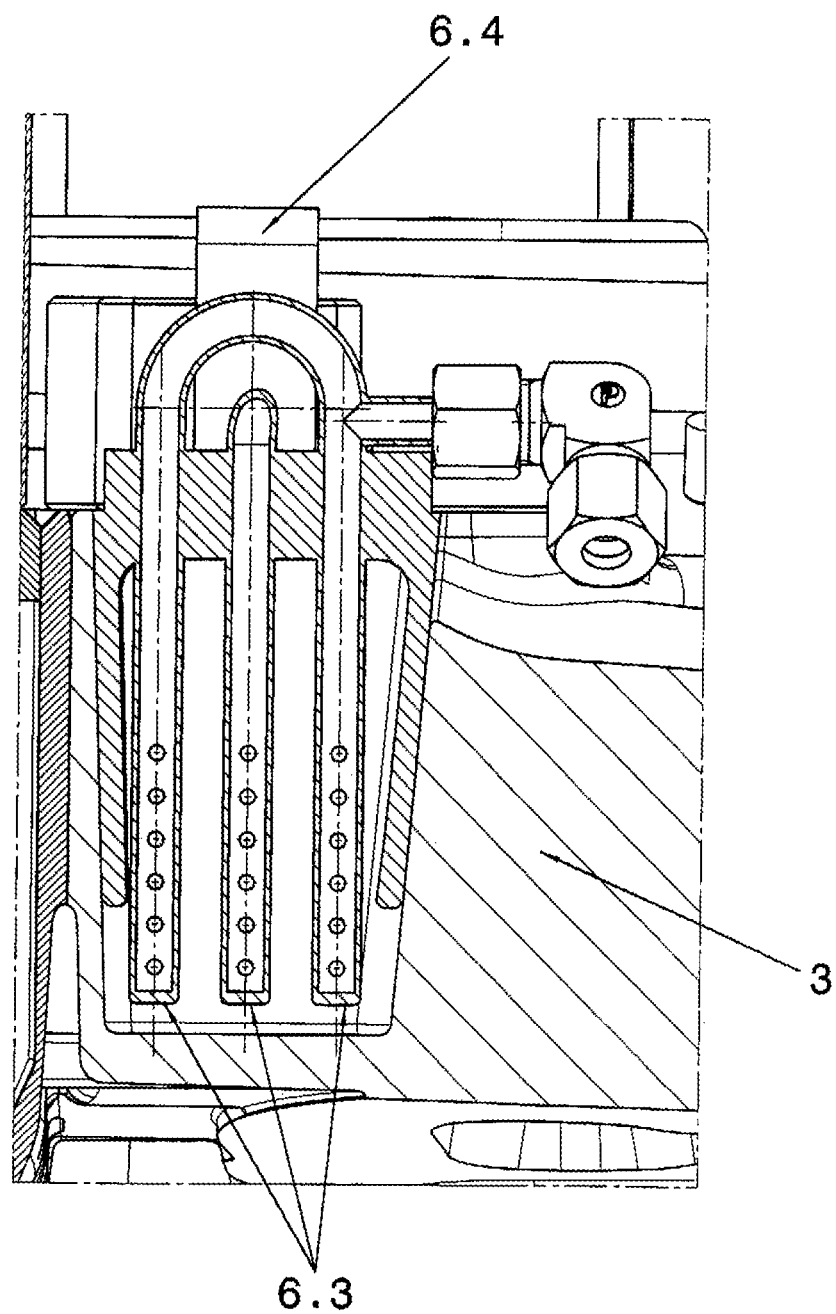

To achieve a mild cooling, air cooling is employed; according to FIGS. 7 and 8, different variants of compressed air pipes can be used. Thus, FIG. 7 shows a compressed air pipe 6.1 comprising many air outlet openings 6.2 which are directed towards the mould wall of the mould segments 2. According to FIG. 8, several compressed air end pipes 6.3, arranged in parallel, may be connected to a central pipe 6.4. This will enlarge the effective cooling surface, which according to FIG. 8 consists of an end of mould segment 3 which is increased in thickness.

By the above-mentioned measures it is possible to produce an interdendritic, eutectic mixed crystal structure after pouring the melt in, said structure consisting of Al mixed crystals and an AlSi eutectic with coherent phases formed by precipitations of $MgZn_2$ and/or $Mg_3Zn_3Al_2$.

Figure 9:
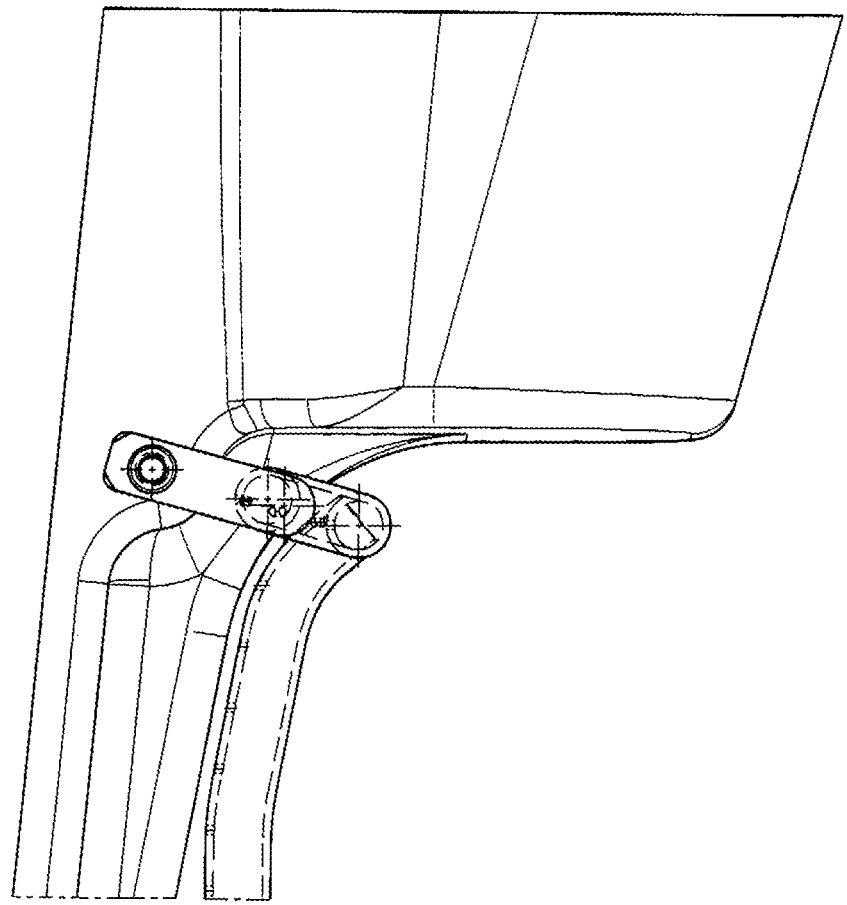

To achieve a mild cooling effect, air cooling is employed, according to FIG. 9, as a pool cooling. A bent cooling pipe may be placed around the casting pool in order to be able to specifically influence the cooling down of the residual melt in the sprue with the aim of controlling the cycle time.

Examinations have shown that the mechanical properties are optimized if the mass ratio of permanent mould to chassis part is, preferably, 0.9 to 1.2, and the eutectic melt is intermittently cooled and heated with a rate of cooling of 0.01 to 10° C. per second. In the process, the data supplied by the thermal sensors are used in a process control as a control variable to achieve optimal solidification. According to Patterson and Engler there are five different types of solidification, with different microstructures, from columnar-rough-walled to dendritic-crosslinked, being obtained depending on the composition of the alloy and the cooling conditions (Patterson, W. and S. Engler: "Einfluss des Erstarrungsablaufs auf das Speisungsvermoegen von Gusslegierungen", Gießerei 48 (1961), Heft 21, S. 633-638 (in German).

It was found that in accordance with the invention the best values for mechanical strength are obtained in the case of a pasty solidification of the melt with intermetallic phases that are distributed interdendritically in the AlSi eutectic, whereby in accordance with the preset cooling conditions an AlSiZnMg mixed crystal structure could be formed that was homogenous and identical in each cross-section of the motor vehicle chassis part.

Figure 10:
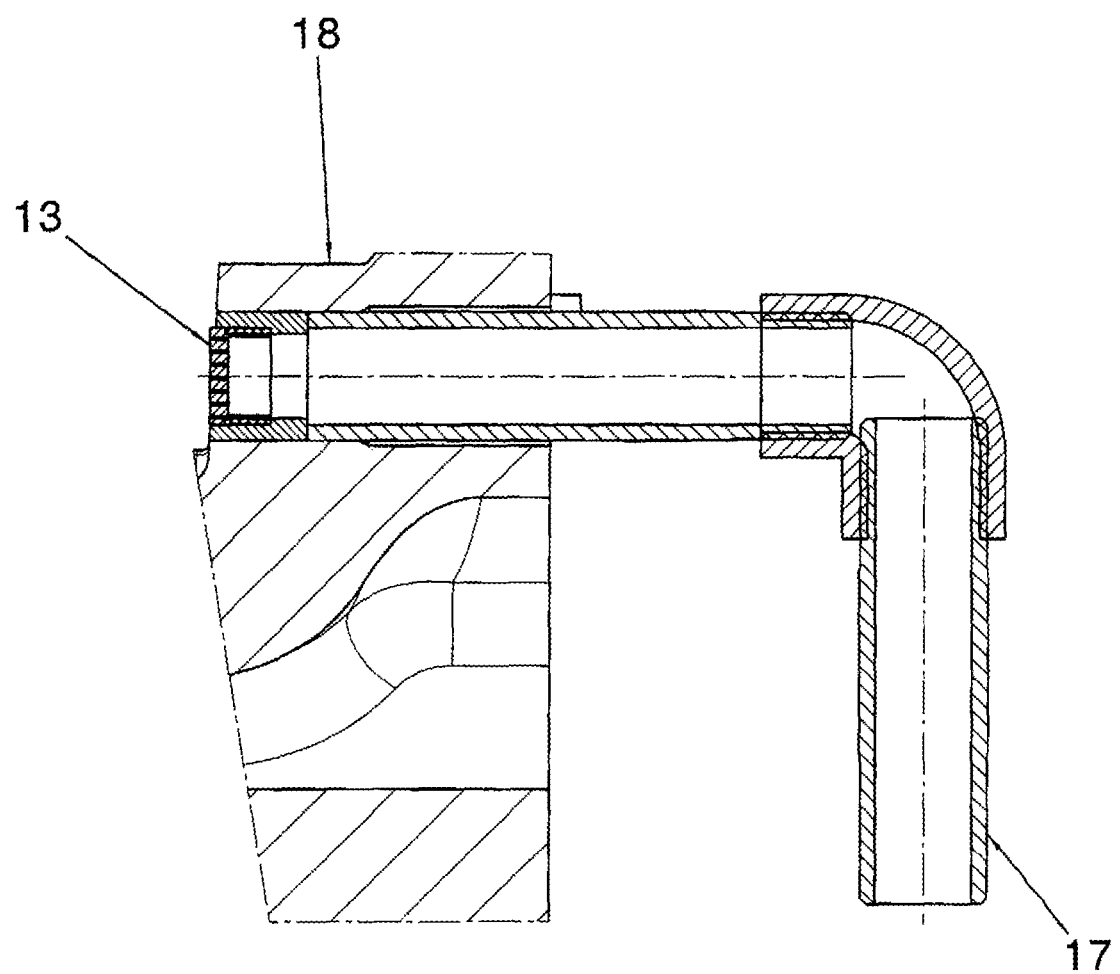
FIG. 10 partial cross-section of a device according to the invention, in the region of a vent.
Figure 11:
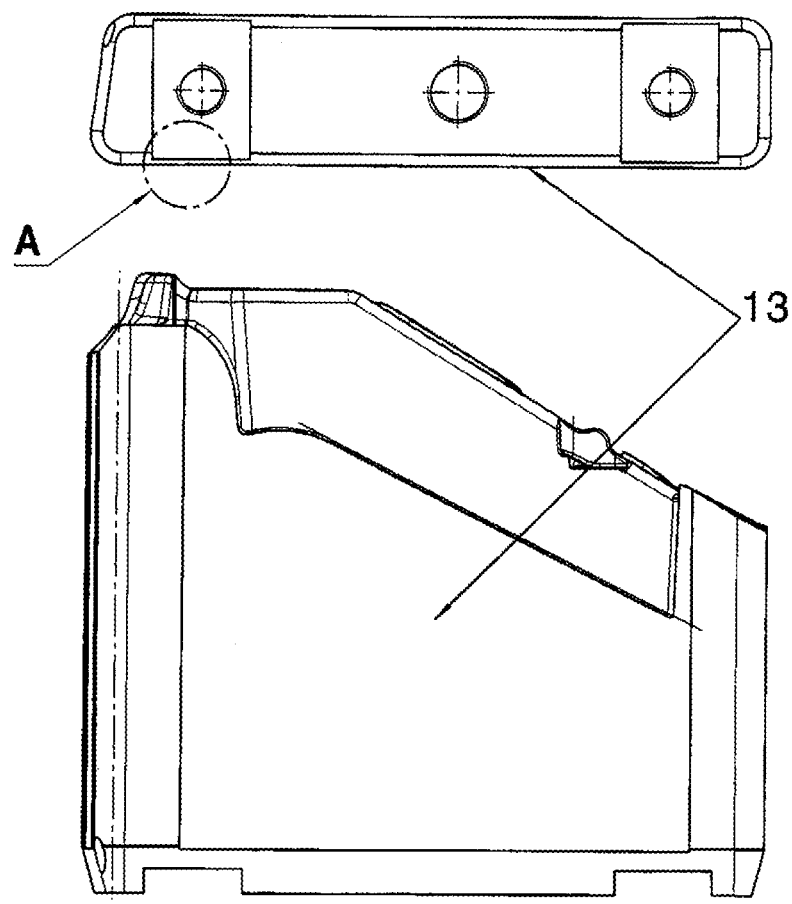
FIG. 11 perspective view of a venting insert for the device according to the invention.
Figure 11:
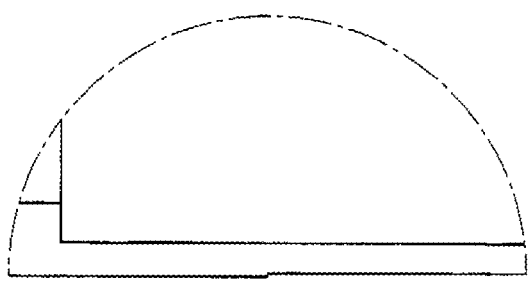
Figure 12:
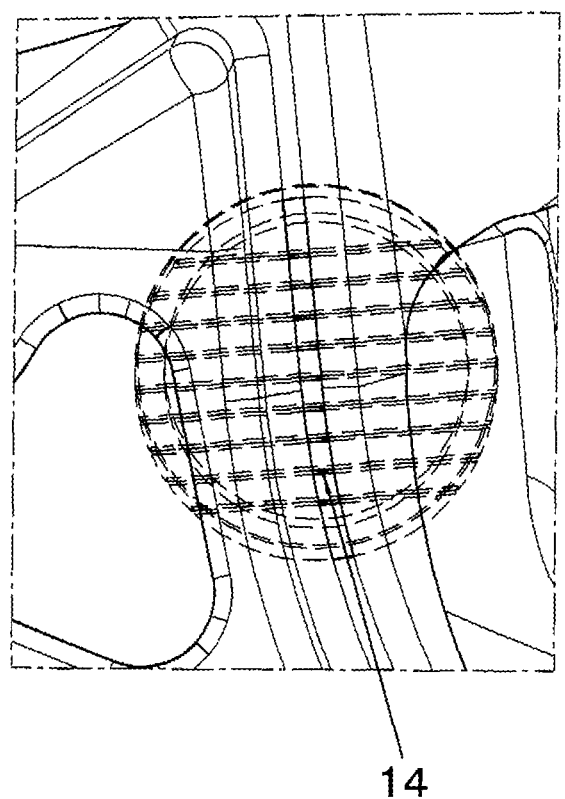
FIGS. 12-14 different variants of the vent according to the invention.
Figure 13:
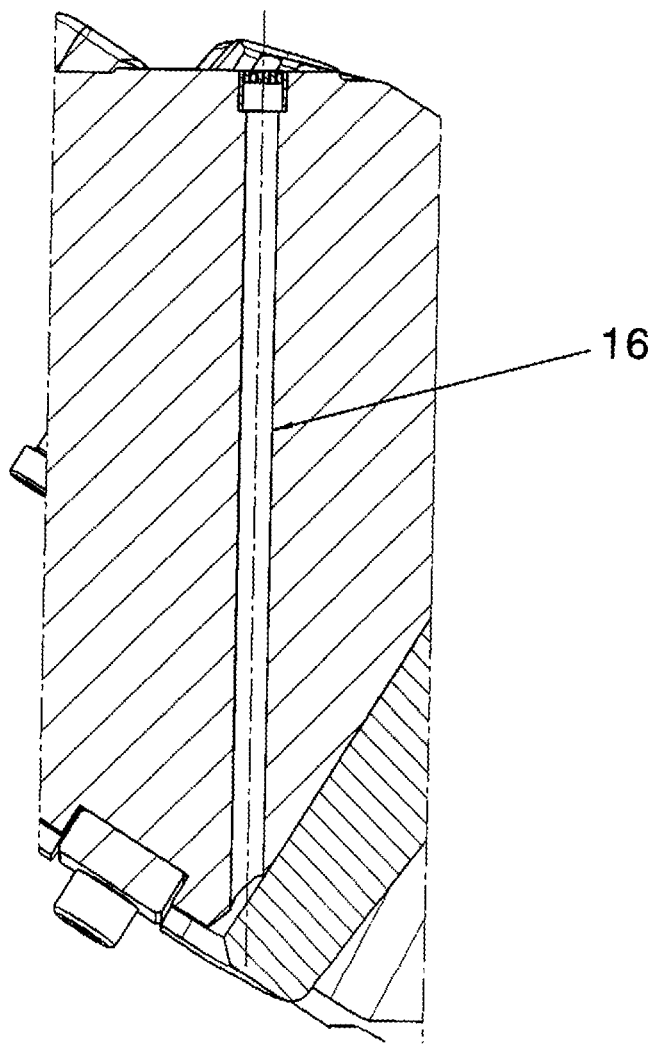
Figure 14:
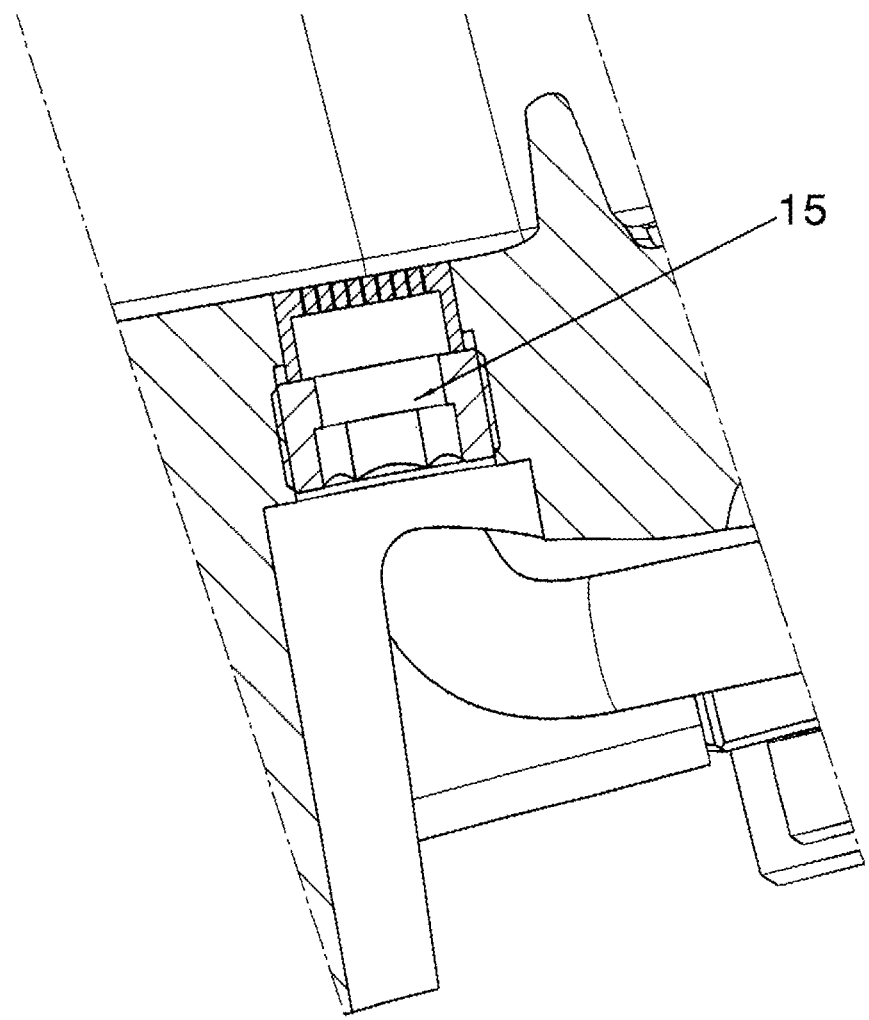

To achieve a high casting quality, it is furthermore necessary that the permanent mould be vented effectively and that inclusions in the castings be avoided. As can be seen from FIG. 10, in accordance with the invention, a mould vent, particularly for suction of the core gases, is arranged on the core walls. Said vent comprises a vent insert 13 that is connected to a vent pipe 17 which in turn is arranged in a core set 18. The effect of the suctioning can be further increased and accelerated by using a vacuum or by use of Venturi nozzles.

Special variants of the present invention provide, according to FIGS. 11-14, for mould vents by use of air bands 13, by rib venting using slot nozzles 14, 15, or by contour venting using slot nozzles 16.

In combination with a grain refinement of the melt by using boron and/or titanium in the form of $AlB_2$, $Al_3Ti$ and AlTiC, it is possible to adjust a density index of below 10%.

Figure 15:
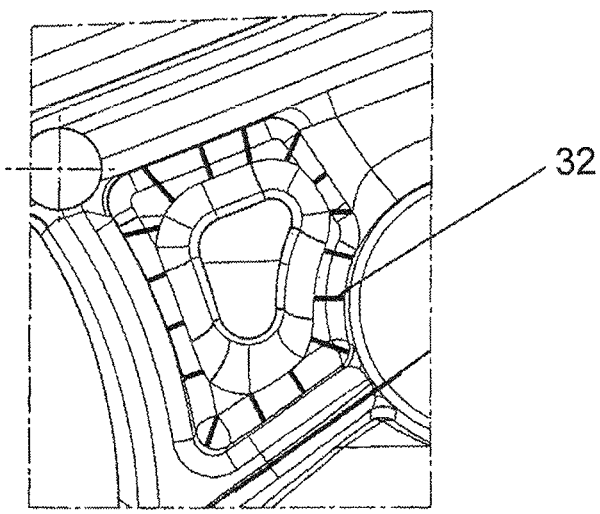
FIGS. 15-17 flow aids and fluting of the permanent mould wall according to the present invention.
Figure 16:
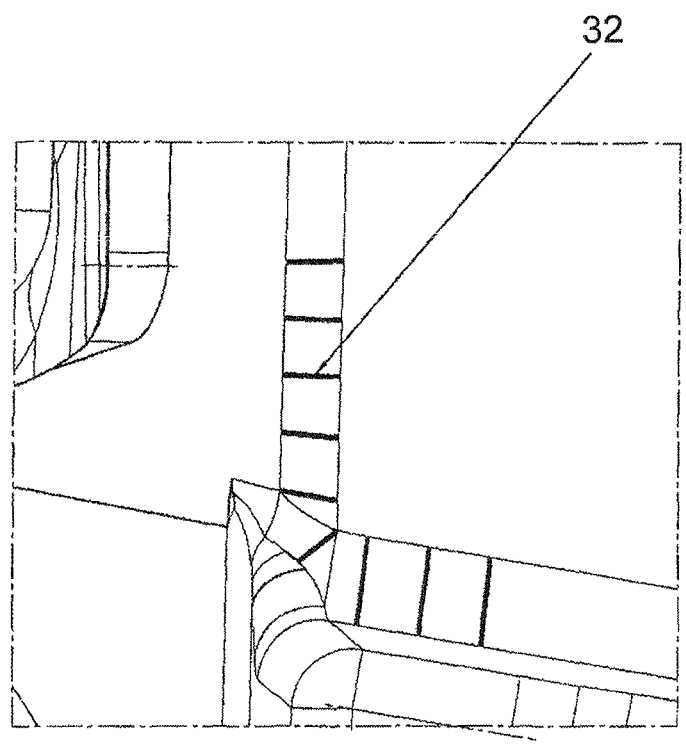
Figure 17:
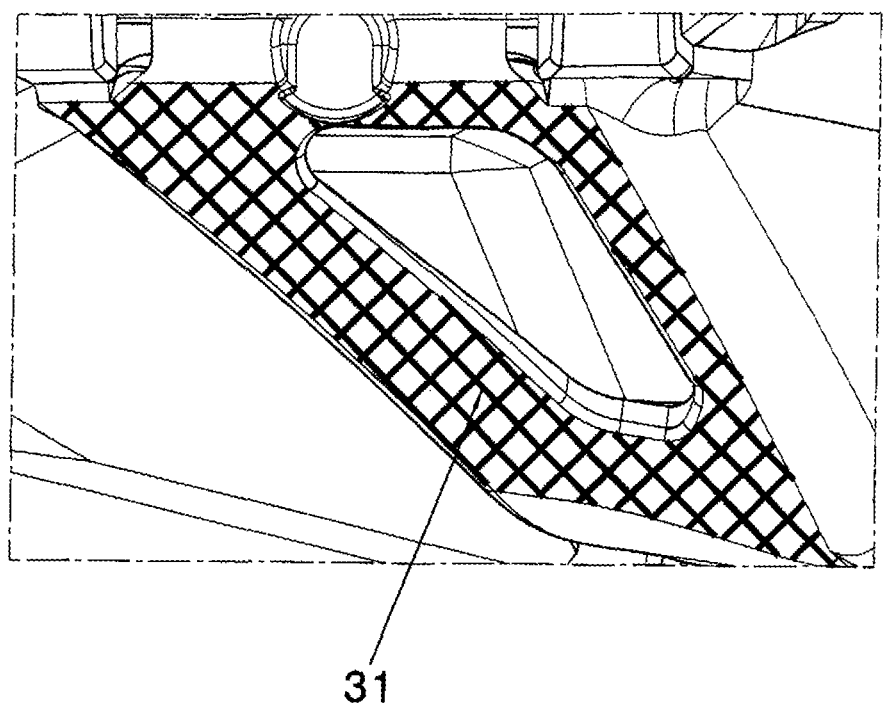
Figure 18:
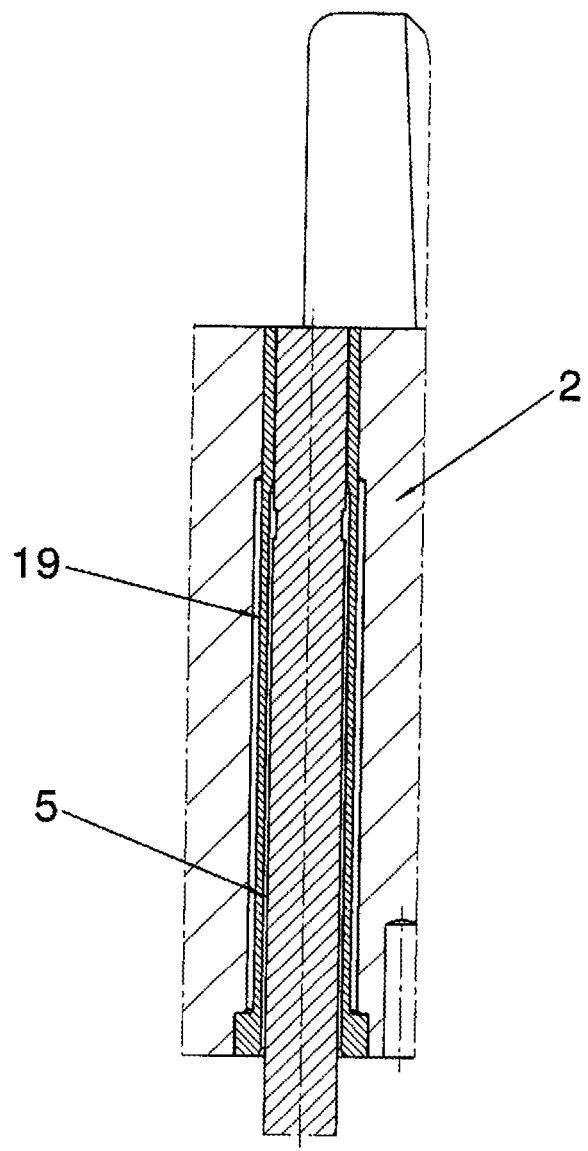
FIGS. 18-19 design and arrangement of the ejectors in the permanent mould.
Figure 19:
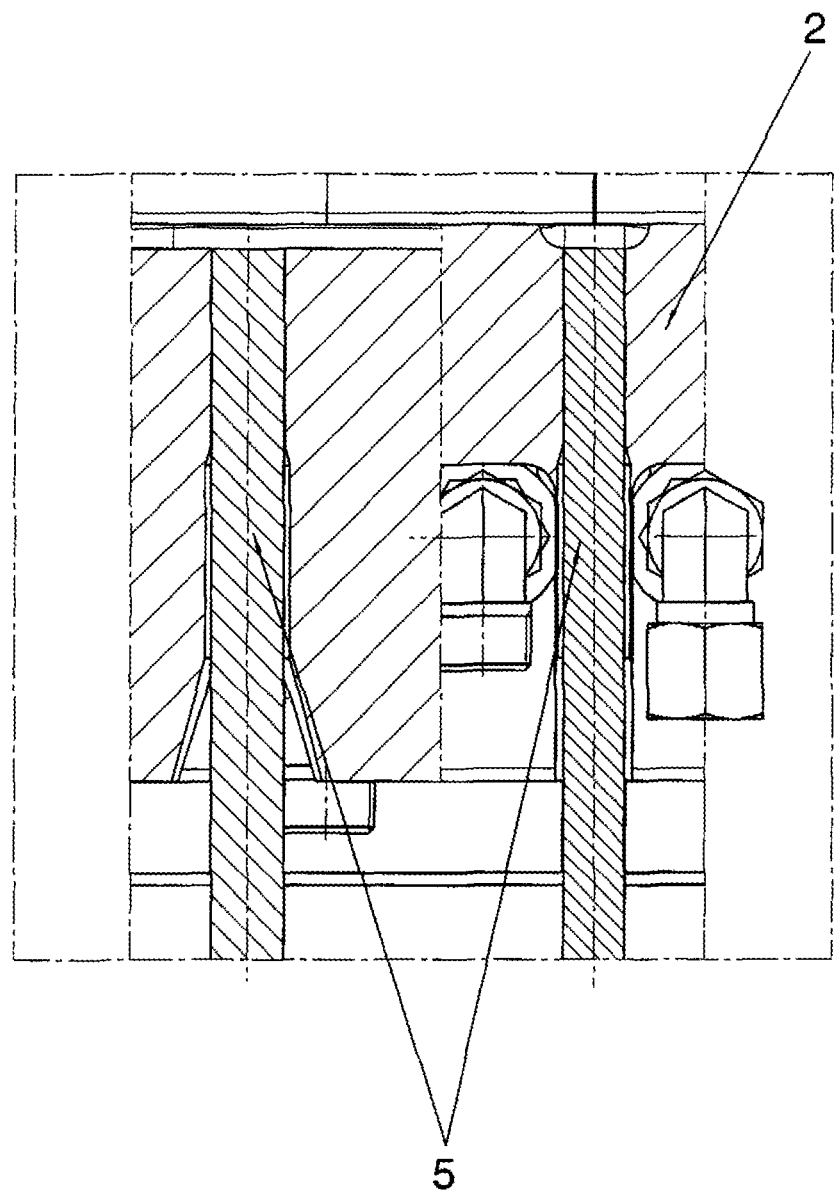

According to a variant of the present invention it is provided for the melt to be filled into the shell-shaped permanent mould such that it rises from the bottom (low-pressure permanent mould) or such that it falls down from the top (gravity permanent mould); during the filling phase, the wall of the permanent mould has a temperature of 350 to 410° C., and the melt is quenched selectively and intermittently at the cross-sections that are subjected to tensile-compressive stresses, at a cooling rate of 5 to 10° C./s, until complete solidification occurs, whereas the ductile regions of the chassis part are cooled at a cooling rate of 0.1 to 4° C./s. In mass production, this is achieved only if in the construction of the component part flow aids 32 and crosswise flutings 31 are provided in the wall of the permanent mould, in accordance with FIGS. 15, 16 and 17. These accelerate the filling of the mould so that solidification of the mould may take place in each case under constant process conditions. Usually, the flow aids 32 and flutings 31 are formed with ball nose cutters of diameter R1 and R0.5. Immediately after solidification, the casting is removed from the mould and is naturally aged. Ejection of the casting is performed by means of ejectors 5, which in FIG. 18 are shown with a wear sleeve. According to the invention, the ejectors 5 are at the same time employed as a venting, via vent channel 19, and for partial cooling of the mould. For this reason, the ejectors 5 are preferably arranged in regions of the permanent mould shell 2 whose thickness has been functionally enlarged, in order to achieve effective cooling of the mould (see FIG. 19).

In summary, it can be stated that by selective solidification of an AlSiZnMg alloy it is possible to produce motor vehicle chassis parts which have high mechanical strength (yield strength greater than 160 Mpa) and excellent temperature stability (130° C., 500 h) while also having good strain properties (A greater than 5%). It was possible to generate a positive impact on corrosion behavior by means of a mixed crystal structure having a specific configuration as, even under unfavorable conditions, no selective corrosion attack occurred, while a uniform surface erosion was observed which remained within the permissible tolerance range.

The density index of less than 10% was adjusted by treating the melt with inert gases or forming gases (nitrogen-hydrogen mixtures/argon-hydrogen mixtures). The parts had few blowholes; the values of strength were identical at all corners and cross-sectional regions of a chassis part. The surface finish was excellent since porosity was low.

According to the invention, by means of the above-mentioned flow aids or fluting, wherein the grooves had a depth of about 0.5 mm and a width of about 1 mm, crack formation is successfully countered. Surface density could be increased when at the same time effective venting was carried out.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A low pressure or gravity pressure casting device for production of chassis parts of an AlSiZnMg alloy by gravity or low-pressure casting, the chassis parts being capable of withstanding high stresses, the device comprising a steel base frame (1), one or more mould segments (2, 3), and a temperature control for the one or more mould segments in conjunction with water cooling or air cooling as well as heating, wherein the one or more mould segments (2, 3) are floatingly supported on the base frame (1) and are made of permanent mould shells having thin-walled and thick-walled regions, the thick-walled regions of the mould shells being formed as supports (20, 30) which floatingly support the one or more mould segments on the base frame, and clamp bolts (12.1, 12.2) being arranged in the thin-walled regions to achieve a punctual clamping of the one or more mould segments to the base frame, and wherein, to cool the one or more mould segments, water connections or air connections are provided on zones having punctiform to surface-like configuration, a local temperature distribution being detectable by thermal sensors (11), respective thermal stresses in the one or more mould segments being compensated for by the clamp bolts.

2. The device according to claim 1, wherein the supports are arranged in marginal regions of the one or more mould segments (2, 3) and are each provided with a centering device and a sliding surface that corresponds to a correspondingly shaped counter surface on the steel base frame (1).

3. The device according to claim 1, wherein in a region of the permanent mould shells, the thickness of which has been functionally enlarged for a specific purpose, ejectors (5) are arranged for simultaneous venting and cooling of a mould cavity.

4. The device according to claim 1, wherein the permanent mould shells are vented via slot nozzles and venting inserts (13-16).

5. The device according to claim 1, wherein in a region of core prints, core inserts or inserted parts, suction of core gases is performed via vacuum connections.

6. The device according to claim 1, wherein a pool cooling is arranged in a region of a sprue, ejectors (5) are provided with corresponding connections to vent and partially cool the mould shells, and tungsten-nickel-based inserts (4) are arranged in regions of the mould shells that are subject to high stresses.

7. The device according to claim 1, wherein a vertical cooling hole is arranged in a mould segment to control a temperature of a zone having punctiform configuration, said vertical cooling hole having a diameter of 10-40 mm.

8. The device according to claim 7 wherein the vertical cooling hole has a diameter of 15-25 mm.

9. The device according to claim 1, wherein cooling plates or cooling ribs are arranged in a region of the one or more mould segments having a surface-like configuration to cool the one or more mould segments, cooling plates or cooling ribs having a surface area of 1000 to 50,000 $mm^2$.

* * * * *